(12) United States Patent
McIntyre

(10) Patent No.: US 9,185,898 B2
(45) Date of Patent: Nov. 17, 2015

(54) INSECT REPELLANT DEVICE

(71) Applicant: Kyle McIntyre, Westfield, NJ (US)

(72) Inventor: Kyle McIntyre, Westfield, NJ (US)

( * ) Notice: Subject to any disclaimer, the term of this patent is extended or adjusted under 35 U.S.C. 154(b) by 0 days.

(21) Appl. No.: 14/477,337

(22) Filed: Sep. 4, 2014

(65) Prior Publication Data

US 2015/0101547 A1 Apr. 16, 2015

Related U.S. Application Data

(60) Provisional application No. 61/889,836, filed on Oct. 11, 2013.

(51) Int. Cl.
*A01K 37/00* (2006.01)
*A01M 29/12* (2011.01)
*A01M 1/20* (2006.01)

(52) U.S. Cl.
CPC ............. *A01M 29/12* (2013.01); *A01M 1/2055* (2013.01)

(58) Field of Classification Search
CPC ..... A01M 29/12; A01M 1/2055; A01K 37/00
USPC .......................................... 119/653, 654, 712
See application file for complete search history.

(56) References Cited

U.S. PATENT DOCUMENTS

| | | | | |
|---|---|---|---|---|
| 1,732,028 A | * | 10/1929 | Reiner | 239/36 |
| 2,521,942 A | * | 9/1950 | Pearsall | 422/305 |
| D245,522 S | * | 8/1977 | Mulkey et al. | D30/199 |
| 4,374,571 A | * | 2/1983 | Hirvela | 239/36 |
| 4,402,433 A | * | 9/1983 | Webinger | 222/485 |
| D283,128 S | * | 3/1986 | Bate | D14/249 |
| 5,258,181 A | | 11/1993 | Cregier et al. | |
| D368,508 S | | 4/1996 | Garrett | |
| 5,988,520 A | * | 11/1999 | Bitner | B65F 7/00 220/300 |
| 6,061,950 A | * | 5/2000 | Carey et al. | 43/125 |
| 6,244,518 B1 | * | 6/2001 | Pogue | 239/36 |
| 6,389,739 B1 | * | 5/2002 | Borut et al. | 43/125 |
| 2002/0006424 A1 | | 1/2002 | Watanabe et al. | |
| 2006/0188538 A1 | | 8/2006 | Emmrich et al. | |

FOREIGN PATENT DOCUMENTS

WO 2008019452 2/2008

OTHER PUBLICATIONS http://www.forestry-suppliers.com/product_pages/Products.asp?mi=41881&title=Bug%20Button,%20pack%20of%2012&itemnum=25324 (Retrieved from internet Nov. 24, 2014).
www.japanmarketingnews.com/health_products/ (Retrieved from internet Nov. 24, 2014).

* cited by examiner

*Primary Examiner* — Rob Swiatek
*Assistant Examiner* — Ebony Evans
(74) *Attorney, Agent, or Firm* — Gearhart Law, LLC

(57) ABSTRACT

An insect repellent device having a top section and a bottom section can be attached via a fastening mechanism near the facial area of a user. The top section and the bottom section are rotatably joined to form a single unit and an insect repellent compound is contained internally. A plurality of slits in each of the top section and the bottom section enable air to pass through the device and intermix with the insect repellent compound.

15 Claims, 9 Drawing Sheets

INSECT REPELLANT DEVICE

CLAIM OF PRIORITY

This application claims priority to U.S. Application Ser. No. 61/889,836 filed on Oct. 11, 2013 the contents of which are herein fully incorporated by reference in its entirety.

FIELD OF THE EMBODIMENTS

The present invention and its embodiments relate generally to insect repellant devices. More specifically, the present invention is a housing containing an insect repelling compound, where the housing is intended to be clipped or affixed to a user or an article of clothing near the user's face.

BACKGROUND OF THE EMBODIMENTS

Modern technology and business has driven many people to live in sprawling urban areas which have little resemblance to the natural, untamed environment. As such, many jobs in the modern world take place within enclosed office buildings. The prevalence of office work in the modern workforce has created a vast disconnect between the daily lives of hundreds of thousands, if not millions, of people and the natural environment. That being the case, many people enjoy taking breaks from their daily lifestyle in order to both relax and reconnect with the natural environment.

There are many hobbies and activities which can enable an individual to slow down and enjoy their surroundings. Golfing, fishing, hiking, and camping are all popular forays which can allow a person to relax and escape from the demands of the modern lifestyle, even if only for a short time. Although the purpose of these activities is to both create enjoyment and to allow people to reconnect with nature, there are some inconveniences that come along with the outdoors that are virtually unavoidable. For example, the prevalence of gnats and mosquitoes constantly buzzing around the face and head can be extremely annoying. This annoyance is only amplified when the person is attempting to focus on a specific task such as making a difficult shot in a game of golf, or keeping their eyes on their bobber in anticipation of a fish striking their line while fishing.

In response to the need to deter flying insects from annoying people in the outdoors, many technologies have been developed. Currently available methods of keeping bugs away from a person include, but are not limited to, bug repellant sprays and bug repellant dispensers which clip to the waistband of clothing articles. Bug repellant sprays which come in aerosol and spray bottles are typically effective at repelling insects, and are therefore usually used in certain situations such as hiking or camping. However, bug sprays are very odorous and can sting the user's eyes, as well as interfere with their grip if applied to the hands. The fact that bug repellants tend to sting the eyes means that bug repellant sprays are typically not applied to the face of a user, potentially leaving the user's face exposed to assault by legions of annoying gnats and mosquitoes. This, combined with other numerous disadvantages, can make the use of bug repellant sprays almost as annoying as dealing with the bugs themselves.

Bug repellant dispensers are an alternative which utilize reservoirs of bug repellant which are constantly dispersed from a small device utilizing a powered fan. The disadvantages of this device are numerous in that these devices are bulky and can interfere with certain motions of the user such as a golf swing. However, in many situations, it is only necessary that the bugs be kept away from a person's face as opposed to their entire body; this is particularly true when the user is golfing.

Review of Related Technology:

U.S. Patent Application 2006/0188538 pertains to an insect repellent patch of a size and weight compatible for wearing on the clothing or skin of a user. The patch has a gross area not in excess of 232 cm$^2$ and bearing one or more insect repellents having a vapor pressure at 25° C. of not less than about $1 \times 10^{-6}$ mm Hg. The total amount of insect repellent is in an amount effective to provide practical mosquito personal area repellency. Kits of such patches, with instructions for use, and methods of providing practical personal area insect repellency are also disclosed.

International Application WO2008/019452 pertains to an insect repellent composition that repels flies, gnats, mosquitoes, lice, ticks, and fleas. The insect repellent composition comprises an effective amount of a phosphorous containing compound having the formula $(RO)_3P=Ox$ or $(RO)_2P=Ox(OH)$ alone or in synergistic combination with any one or more compounds selected from a group comprising $C_{10}$-$C_{20}$ mono-unsaturated hydrocarbons, optionally substituted $C_1$-$C_{10}$ alkyl esters, and dicarboxylic acids; wherein R is an optionally substituted $C_1$-$C_{10}$ alkyl group or aryl or aryl substituted with $C_1$-$C_{10}$ alkyl or alkoxy; and x is 0 or 1, and a carrier vehicle.

As described, various devices are known in the art. However, their structure and means of operation are substantially different from the present disclosure. Thus, it is clear that there is a need for a more compact bug repellant device which can effectively repel insects from a user's face without interfering with the motions of the user, or annoying the user in any way. At least one embodiment of this invention is presented in the drawings below and will be described in more detail herein.

SUMMARY OF THE EMBODIMENTS

An insect repellent device for positioning near the facial region of a user is described and taught having a top section with a first outer surface and a first inner surface, the top section having a plurality of first slits, wherein the plurality of first slits traverse the first outer surface and the first inner surface; a bottom section with a second outer surface and a second inner surface, the bottom section having a plurality of second slits, wherein the plurality of second slits traverse the second outer surface and the second inner surface; an insect repellent compound; and wherein the top section is rotatably coupled to the bottom section with the insect repellent compound contained therebetween.

In another embodiment of the present invention there is an insect repellent device having a circular top section with a first outer surface and a first inner surface, the top section having a plurality of first slits, wherein the plurality of first slits traverse the first outer surface and the first inner surface and wherein the first inner surface has a locking mechanism protruding therefrom; a circular bottom section with a second outer surface and a second inner surface, the bottom section having a plurality of second slits, wherein the plurality of second slits traverse the second outer surface and the second inner surface and wherein there is a grooved track disposed on at least a part of the outer surface of the bottom section; an insect repellent compound; a fastening mechanism coupled to either the circular top section or the circular bottom section; and wherein the top section is rotatably coupled to the bottom section with the insect repellent compound contained therebetween.

Generally, the present invention and its embodiments provide for an insect repellent device. The device is an autonomous unit that uses air flow to disperse an insect repellent compound. A top section of the device is rotatably coupled to a bottom section by way of a grooved track and locking mechanism. This enables for quick and easy disassembly enabling one to change the insect repellent compound as need be. Further, the grooved track allows for the rotational movement between the top section and the bottom section. Each of the top section and the bottom section have a plurality of slits interspersed around the perimeter of each piece. The rotational movement can cause these slits to be aligned or unaligned respective to one another. This either permits air flow through the device or restricts/limits the air flow thereby preserving the insect repelling compound when not in use. A fastening mechanism enables adherence to any number of secondary articles including hats, glasses, visors, clothing, and the like or any combination thereof.

In general, the present invention succeeds in conferring the following, and other not mentioned, benefits and objectives.

It is an object of the present invention to provide an insect repellent device that is compact, easy to use, and easily attachable to the user's person near their face.

It is an object of the present invention to provide an insect repellent device that utilizes natural airflow to distribute insect repellant compounds.

It is an object of the present invention to provide an insect repellent device that can easily be disassembled enabling quick and simple replacement of an insect repellent.

It is an object of the present invention to provide an insect repellent device that is lightweight.

It is an object of the present invention to provide an insect repellent device that is reusable.

It is an object of the present invention to provide an insect repellent device that allows a user's hands to remain free.

Figure 1:
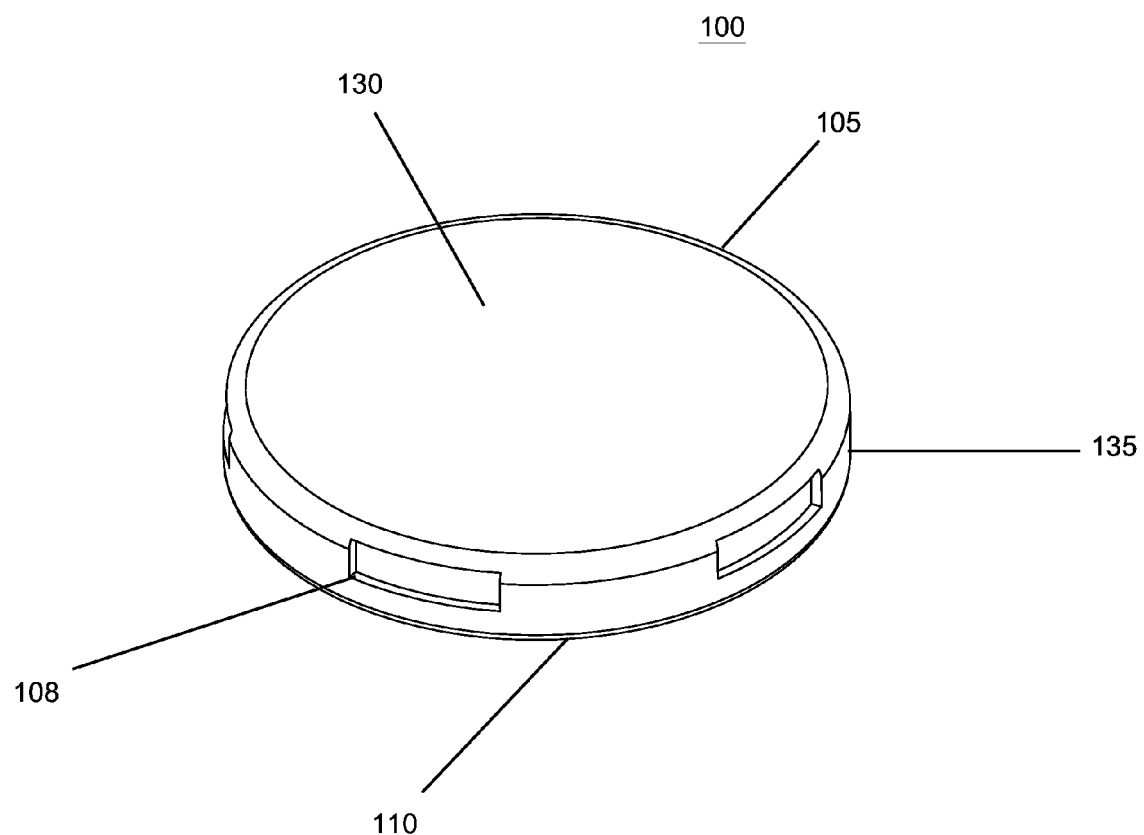
FIG. 1 is a perspective view of an embodiment of the present invention.

DESCRIPTION OF THE PREFERRED
EMBODIMENTS

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, there is an insect repellent device 100 that has a top section 105 and a bottom section 110. The top section 105 fits over the bottom section 110 (see FIG. 6) and is rotatably coupled thereto. The top section 105 has a circular top 130 and a top circular wall 135. The top circular wall 135 is coupled to the circular top 130 with the top circular wall 135 having a height thereby forming a cylinder with one end sealed by the circular top 130.

Along the top circular wall 135 there are a plurality of first slits 108. The number of these slits may vary but are preferably between about one (1) to about ten (10) and are more preferably about four (4) to about five (5). The dimensions of each of the plurality of first slits 108 may vary but are preferably about 0.25 cm (0.1 inch) to about 5 cm (2 inch) in length. The plurality of first slits 108 are preferably about 1.3 cm (0.5 inch) in length. The plurality of first slits 108 may have a height ranging from about 0.25 cm (0.1 inch) to about 2.5 cm (1 inch) and are preferably about 0.5 cm (0.2 inch) in height. Each if the plurality of second slits 118 (see FIG. 6) will have approximately the same dimensions as the corresponding plurality of first slits 108.

Figure 2:
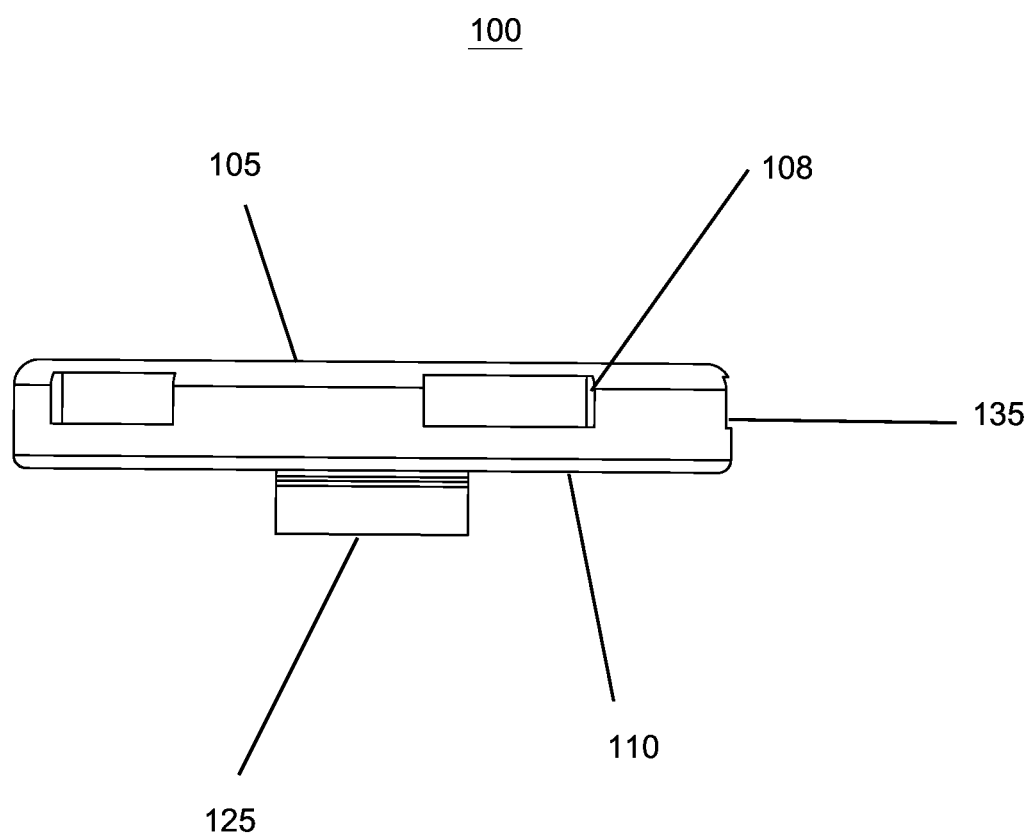
FIG. 2 is a front view of an embodiment of the present invention.

In FIG. 2 the insect repellent device 100 is shown from the side. Here the relationship between the top section 105 and the bottom section 110 is more prominent. A fastening mechanism 125 is coupled to the bottom section 110. Also visible are two of the plurality of first slits 108 in the top circular wall 135.

Figure 3:
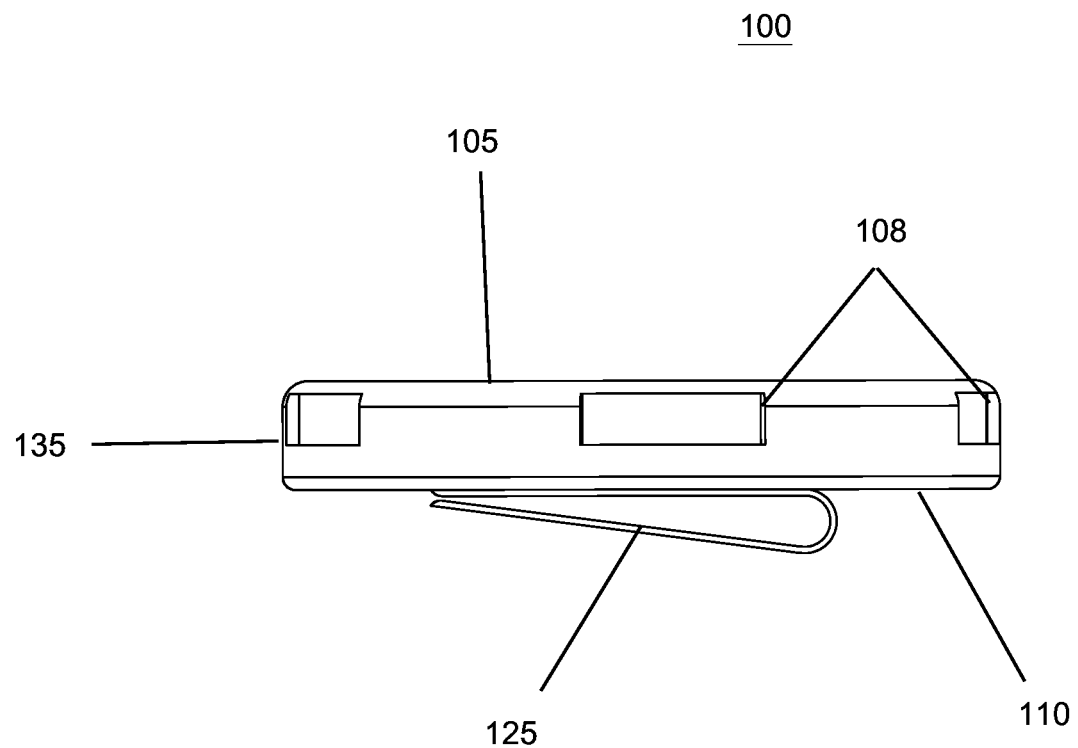
FIG. 3 is a side view of an embodiment of the present invention.

FIG. 3 shows a second side view of the insect repellent device 100 giving a more complete view of the potential structure of the fastening mechanism 125. In this embodiment, the fastening mechanism 125 is a clip with two tabs. One tab is coupled to the bottom section 110, whereas the other is used to secure the insect repellent device 100 to a secondary object such as an article of clothing. The fastening mechanism 125 is preferably a flexible plastic component that attempts to retain its shape when a force is applied to it. The fastening mechanism 125 may be removable or may be formed as part of the bottom section 110 (or top section 105).

The fastening mechanism 125 may further be any type of mechanism capable of releasably coupling two bodies such as snaps, locks, clips, zippers, clasps, magnets, buttons, and the like or any combination thereof. Further, the plurality of first slits 108 is shown in the top circular wall 135 of the top section 105.

Figure 4:
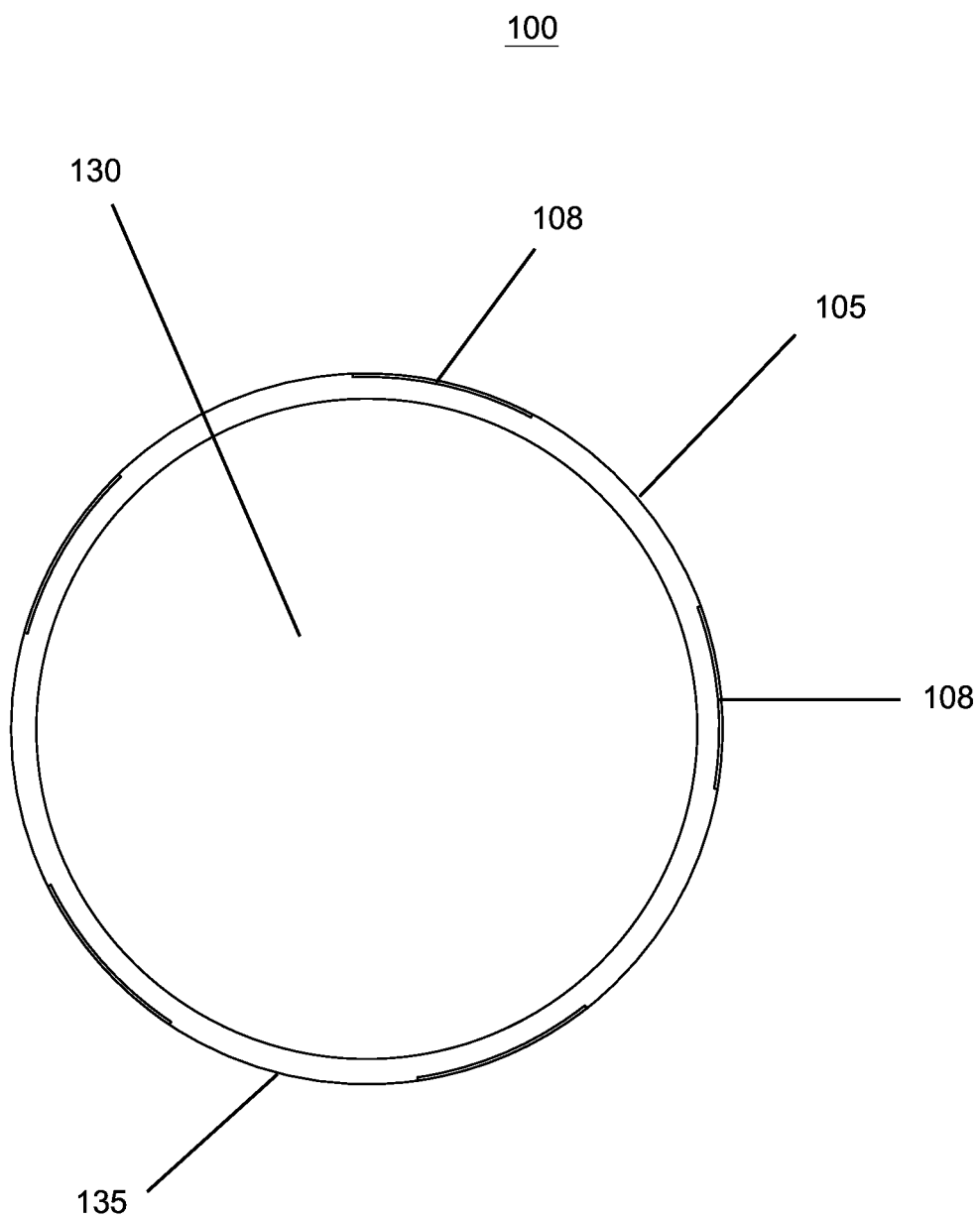
FIG. 4 is a top view of an embodiment of the present invention.

FIG. 4 is a top view of the insect repellent device 100. The top section 105 is visible with the circular top 130 and top circular wall 135 being shown. The plurality of first slits 108 is shown generally dispersed evenly around the circumference of the top section 105. While the insect repellent device 100 is generally shown to be circular, it should be recognized that a number of shapes may be used without detracting from the concept of the invention.

Figure 5:
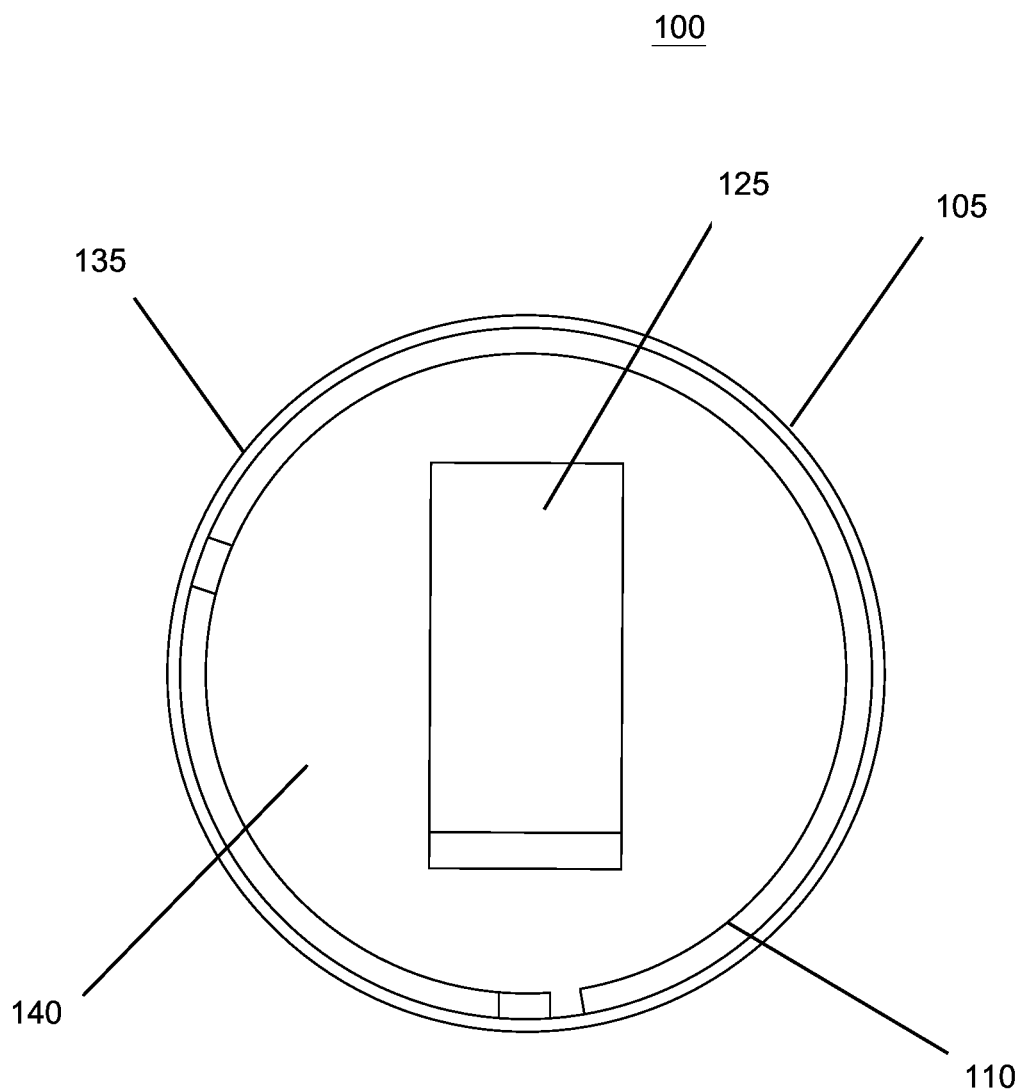
FIG. 5 is a bottom view of an embodiment of the present invention.

In FIG. 5 there is a bottom view of the insect repellent device 100. Here, the fastening mechanism 125 is shown coupled to the bottom section 110. Additionally, the top section 105, namely the top circular wall 135 is shown encircling the bottom section 110. The circular bottom wall 140 is also shown.

Figure 6:
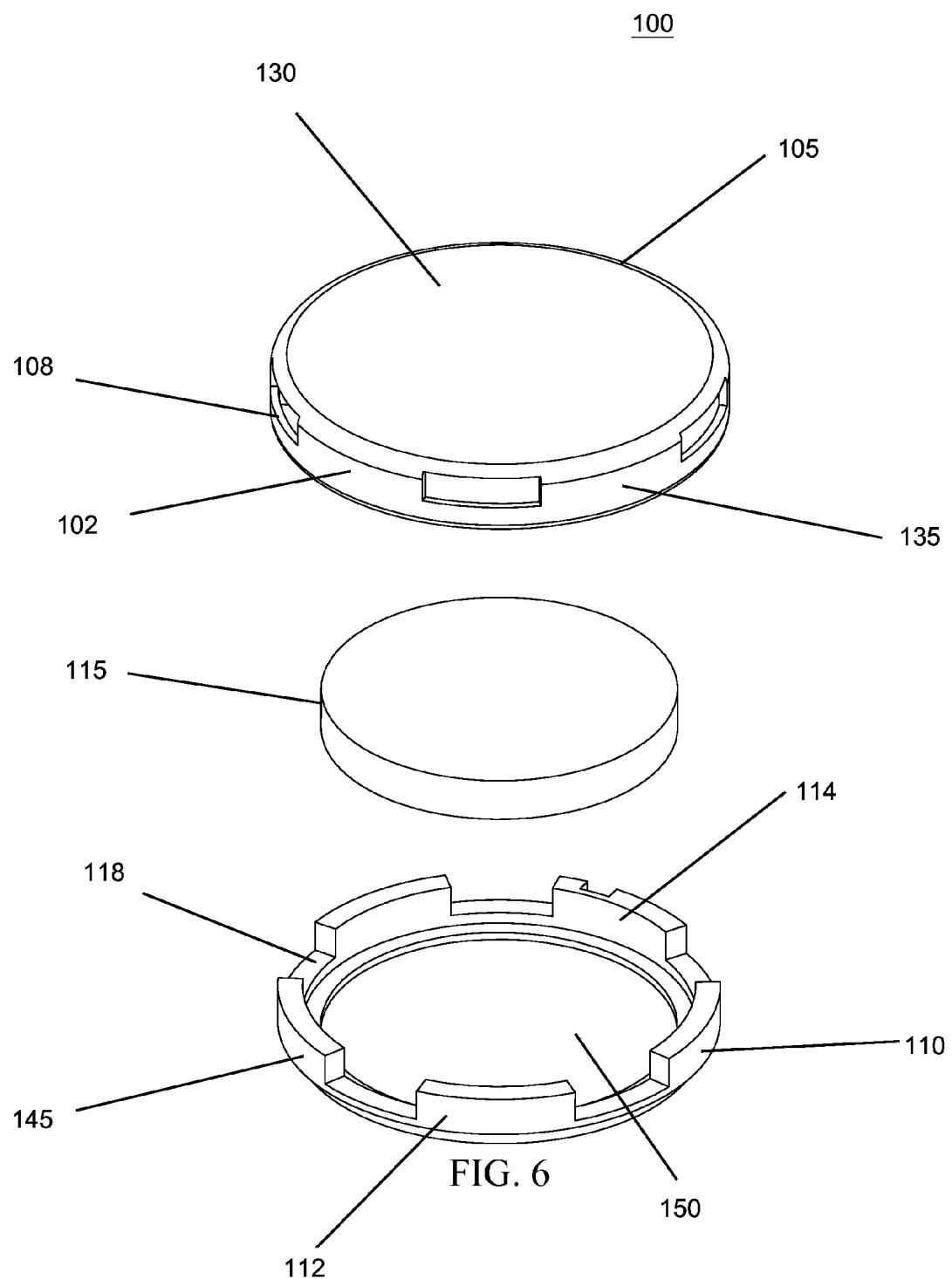
FIG. 6 is an exploded perspective view of the present invention.
Figure 7:
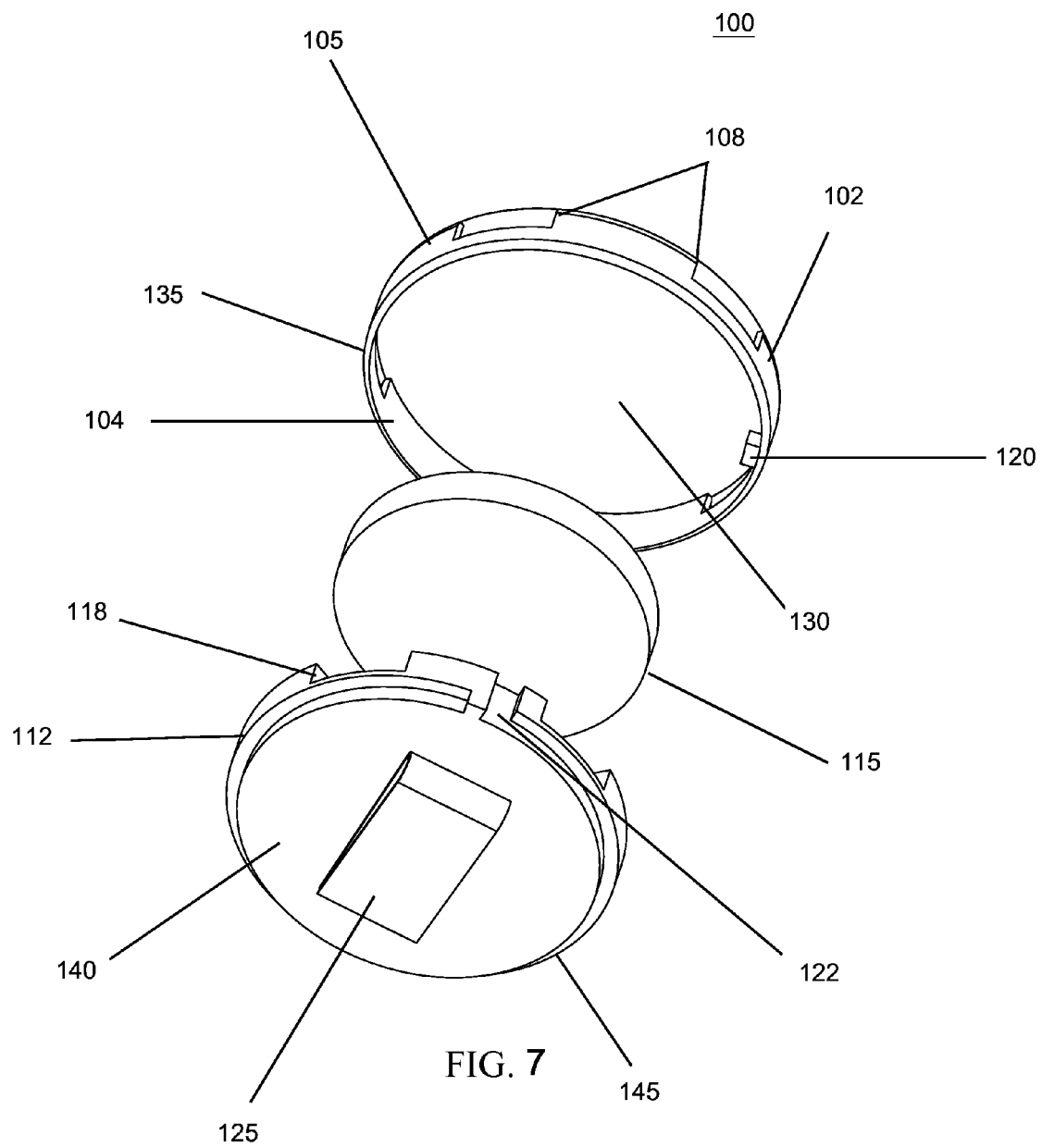
FIG. 7 a bottom perspective exploded view of the present invention.

In FIGS. 6 & 7 there are exploded views of the insect repellent device 100 that demonstrate the interrelationship between the components of the device. The top section 105 is shown having a first outer surface 102 and a first inner surface 104. Additionally the top section 105 comprises a circular top 130 and a top circular wall 135. The first outer surface 102 comprises the outer surface of the circular top 130 and the top circular wall 135. The first inner surface comprises the inner surface of the circular top 130 and the top circular wall 135. A plurality of first slits 108 are shown in the top circular wall 135.

The top section 105 further has a locking mechanism 120 disposed on the inner surface 104 of the top section 105. The locking mechanism 120 is preferably rectangular or square in shape, although it may be any number designs or shapes. The locking mechanism 120 interacts with the grooved track 122 disposed in the second outer surface 112 of the bottom circular wall 145 to provide a rotatable connection between the top section 105 and the bottom section 110. As shown in FIG. 7, the grooved track 122 is a channel that mirrors the shape and dimensions of the locking mechanism 120. Thus, the locking mechanism 120 is inserted into the grooved track 122 and slid along the grooved track 122. The grooved track 122 is shaped so that the result of following the grooved track 122 with the locking mechanism 120 rotatably couples the top section 105 to the bottom section 110.

The insect repellent compound 115 is placed between the top section 105 and the bottom section 110 and then the two sections are combined. In the bottom of the bottom section 110 there is a recess 150 as shown in FIG. 6. The recess 150 is intended to provide support or an area for the insect repellent compound 115 to be administered. The locking mechanism 120 is then lined up with the grooved track 122 and the locking mechanism 120 is inserted and the two sections rotated in opposing directions thereby securing the top section 105 to the bottom section 110 with the insect repellent compound 115 within.

This rotatable movement can also cause the plurality of first slits 108 and the plurality of second slits 118 to either align or misalign. The plurality of second slits 118, unlike the plurality of first slits 108 may not be completely bounded by the respective circular wall. As shown in FIG. 6, the plurality of second slits 118 on the bottom section 110 are bounded on three sides (side 1, side 2, and the bottom) leaving the top exposed. However, since the bottom section 110 is smaller than and fits within the top section 105 this lack of a top does not provide any adverse effect. In some instances, the plurality of second slits 108 will look exactly like the plurality of first slits 108.

Figure 8:
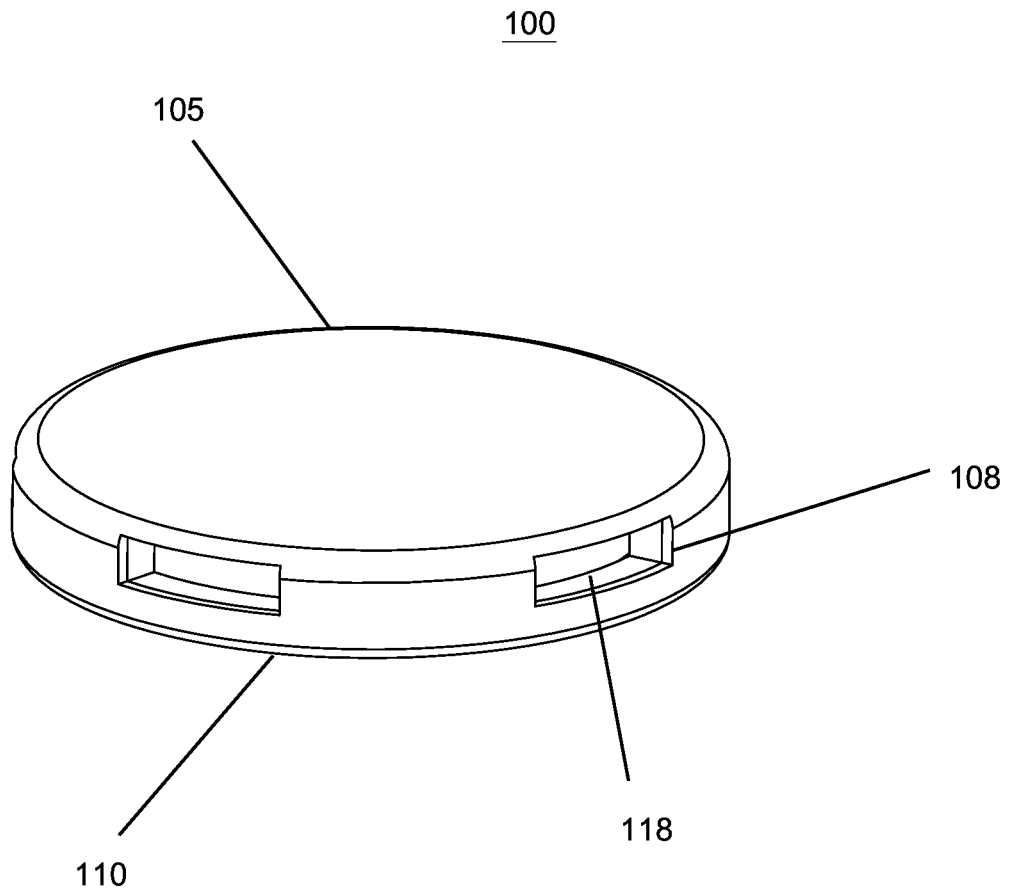
FIG. 8 is a perspective view of the present invention with the top section twisted relative to the bottom section such that the plurality of slits are aligned.
Figure 9:
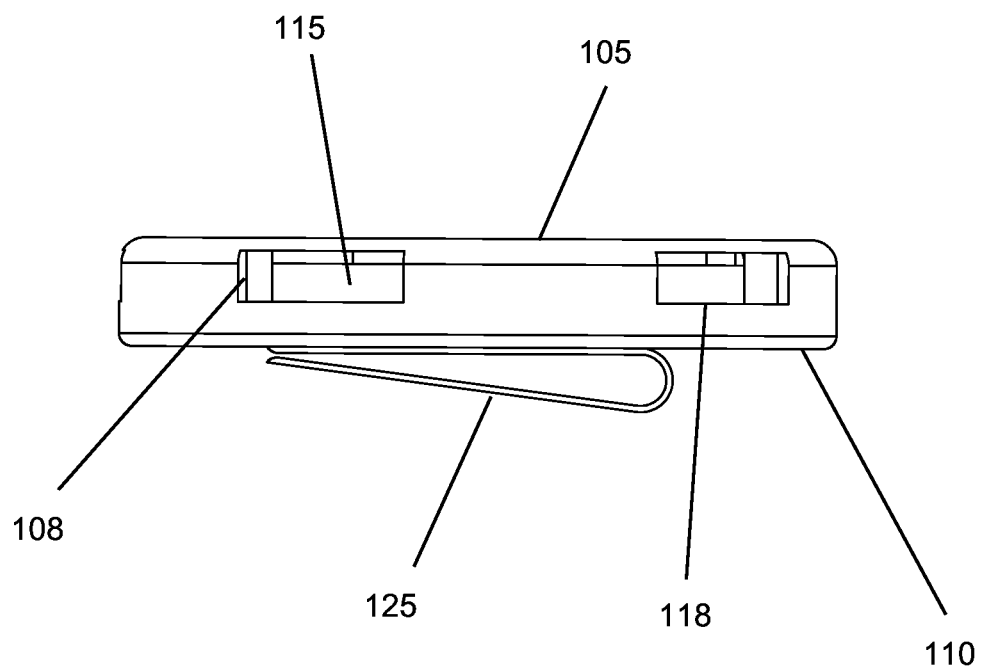
FIG. 9 is a side view of the configuration shown in FIG. 8.

In FIGS. 8 & 9, the insect repelling device 100 is shown with the plurality of first slits 108 and the plurality of second slits 118 aligned with one another. This creates an open pathway for air to flow thereby enabling the insect repellent compound to be dispersed into the surrounding environment. The top section 105 and the bottom section 110 may be rotated as such that the plurality of slits form openings that are either partially or wholly blocked at any given time or may fully allow air to pass through.

In using the insect repellent device 100 described in FIGS. 1-9, one preferably can clip via the fastening mechanism 125 the insect repellent device 100 to an area near a facial region of the user. Practically speaking, this allows the user to prevent insects from biting, landing, or otherwise annoying the user in at least their facial region. This is due to the size and the weight of the insect repellent device 100.

The insect repellent device 100 may comprise a number of materials including but not limited to metals, plastics, composites, rubbers, textiles, glass, wood, and the like or any combination thereof. Preferably the insect repellent device comprises a lightweight yet resilient plastic such as polyethylene terephthalate (PET), polyethylene (PE), high-density polyethylene, polyvinyl chloride (PVC), polyvinylidene chloride (PVDC), low-density polyethylene (LDPE), polypropylene (PP), polystyrene (PS), high impact polystyrene (HIPS) and polycarbonate (PC), or any combination thereof. The plastics may be fiber reinforced to provide additional resiliency.

Further, the insect repellent device 100 would fit within an area of about 1.3 cm (0.5 inch) to about 10 cm (4 inch) in length and about 1.3 cm (0.5 inch) to about 10 cm (4 inch) in width. Preferably, the insect repellent device 100 fits into about a 2.5 cm (1 inch) by 2.5 cm (1 inch) area and is generally circular. The insect repellent device should be about 1.3 cm (0.5 inch) to about 2.5 cm (1 inch) thick. This sufficiently small size coupled with the preferably used materials above should create a lightweight device that can be clipped to a number of areas without giving the user any sort of discomfort due to weight, bulk, or the like.

The insect repellent compound 115 may be any number or combination of materials such as birch tree bark, citriodiol, DEET, icaridin, nepetalactone, citronella oil, neem oil, dimethyl carbate, tricyclodecenyl allyl ether, IR3535®, and various natural herb based formulations. Depending on the compound(s) used a carrier may be needed to contain the repellent in a particular form or to lengthen the life span of the compound. The compound(s) may also be selected or be combined with certain carriers to prevent or mask an odiferous quality of any of the compounds. The compound(s) may take the form of a disk, as shown in FIG. 6, or may be a gel, putty, emulsion, wafer saturated with insect repelling compounds, or the like or any combination thereof. The insect repellent compound 115 must, however, be capable of being retained by the insect repellent device 100, as to avoid direct contact with the skin, eyes, mouth, etc. of the user.

The insect repellent device 100 may further have additional elements that make it practical in a certain setting. For example, a golfer may prefer the device incorporates a magnetic ball marker. A fisherman may prefer the housing to exhibit magnetic properties thereby giving them a place to secure a free hook momentarily while freeing their hands for another task.

Thus, although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:
1. An insect repellent device comprising:
a top section having a top and a first wall extending therefrom with a first outer surface and a first inner surface, the first wall having a plurality of first slits,
wherein the plurality of first slits traverse the first outer surface and the first inner surface of the first wall;
a bottom section having a bottom and a second wall with a second outer surface and a second inner surface, the second wall having a plurality of second slits,
wherein the plurality of second slits traverse the second outer surface and the second inner surface of the bottom wall;
an insect repellent compound,
wherein the insect repellent compound is retained by a recess in an inner surface of the bottom section;
a square locking mechanism disposed on the first inner surface of the top section, wherein the square locking mechanism protrudes perpendicularly inwards from the first inner surface;

a grooved track shaped to receive the square locking mechanism disposed on at least a portion of the second outer surface of the bottom section;

wherein the top section is rotatably coupled to the bottom section with the insect repellent compound contained therebetween.

2. The insect repellent device of claim 1 wherein the locking mechanism fits within the grooved track thereby rotatably coupling the top section to the bottom section.

3. The insect repellent device of claim 1 wherein a position of the bottom section in relation to a position of the top section changes the operative size of the first plurality of slits.

4. The insect repellent device of claim 3 wherein the position of the plurality of first slits and the position of the plurality of second slits such that any of the plurality of first slits may partially or wholly overlap any of the plurality of second slits.

5. The insect repellent device of claim 1 further comprising a fastening mechanism disposed on either the top section or the bottom section.

6. An insect repellent device for positioning near a facial region of a user comprising:
a circular top section having a top circular wall with a first outer surface and a first inner surface, the top circular wall having a plurality of rectangular first slits disposed around a periphery of the top circular wall,
wherein the plurality of rectangular first slits traverse the first outer surface and the first inner surface of the top circular wall, and
wherein the first inner surface has a locking mechanism protruding perpendicularly inwards therefrom;
a circular bottom section having a bottom circular wall with a second outer surface and a second inner surface, the bottom circular wall having a plurality of rectangular second slits disposed around a periphery of the bottom circular wall,
wherein the plurality of rectangular second slits traverse the second outer surface and the second inner surface of the bottom circular wall, and
wherein a grooved track is disposed on at least a part of the outer surface of the bottom section;
an insect repellent compound,
wherein the insect repellent compound is retained by a recess in an inner surface of the circular bottom section;
a fastening mechanism coupled to either the circular top section or the circular bottom section; and
wherein the top section is rotatably coupled to the bottom section with the insect repellent compound contained therebetween.

7. The insect repellent device of claim 6 wherein a diameter of the top section is larger than a diameter of the bottom section.

8. The insect repellent device of claim 6 wherein the fastening mechanism is a clip, magnet, snap, button, zipper, or any combination thereof.

9. An insect repellent device for positioning near a facial region of a user comprising:
a circular top section with a circular top and a top circular wall, the top circular wall extending downwards therefrom and having a plurality of first slits and the circular top comprising a first solid, unbroken surface,
wherein the plurality of first slits traverse a first outer surface and a first inner surface of the top circular wall, and
wherein the first inner surface has a locking mechanism protruding inwards therefrom;
a circular bottom section with a circular bottom and a bottom circular wall, the bottom circular wall extending upwards therefrom and having a plurality of second slits and the circular bottom comprising a second solid, unbroken surface,
wherein the plurality of second slits traverse a second outer surface and a second inner surface of the bottom circular wall,
wherein there is a grooved track disposed on at least a part of the outer surface of the bottom section, and
wherein a recess is disposed in an inner surface of the circular bottom;
an insect repellent compound,
wherein the insect repellent compound is retained by the recess;
a fastening mechanism coupled to either the circular top or the circular bottom; and
wherein the top section is rotatably coupled to the bottom section forming a chamber with the insect repellent compound contained therein.

10. The insect repellent device of claim 9 wherein the top circular wall extends perpendicularly from the circular top.

11. The insect repellent device of claim 9 wherein the bottom circular wall extends perpendicularly from the circular bottom.

12. The insect repellent device of claim 9 wherein the insect repellent compound is held by a lip formed by the recess.

13. The insect repellent device of claim 9 wherein there is about three to about ten first slits and about three to about ten second slits.

14. The insect repellent device of claim 9 wherein the fastening mechanism is a clip having a first tab and a second tab, with at least one of the first tab and/or the second tab being coupled to the insect repellent device.

15. The insect repellent device of claim 9 wherein the insect repellent device is capable of being magnetically adhered to another object.

* * * * *